United States Patent [19]

Schrock

[11] 4,037,564

[45] July 26, 1977

[54] COLLAPSIBLE LIVESTOCK RAMP

[76] Inventor: Andrew A. Schrock, Rte. 1, Box 204, Shipshewana, Ind. 46565

[21] Appl. No.: 606,286

[22] Filed: Aug. 20, 1975

[51] Int. Cl.² ............................................. B62D 25/00
[52] U.S. Cl. .......................................... 296/61; 119/82
[58] Field of Search .................... 119/82; 214/85, 85.1; 296/61

[56] References Cited

U.S. PATENT DOCUMENTS

| 1,782,554 | 11/1930 | Tool | 119/82 |
| 1,854,673 | 4/1932 | Rust | 119/82 |
| 2,107,371 | 2/1938 | Donnan | 296/61 |
| 2,228,946 | 1/1941 | Carter | 119/82 |
| 2,584,396 | 2/1952 | Naekel | 119/82 |

FOREIGN PATENT DOCUMENTS 383,685   11/1932   United Kingdom .................. 119/82

Primary Examiner—Hugh R. Chamblee
Attorney, Agent, or Firm—Oltsch & Knoblock

[57] ABSTRACT

A livestock ramp which is pivotally connected at one end to a vehicle and which includes opposite side walls connected to opposite side edges of the platform. The platform is shiftable from an inclined position in which livestock may enter or leave the vehicle and an upright position in which the platform spans the door opening into the vehicle. Each of the side walls is pivotally connected to the platform so as to overlie the platform in folded fashion when the platform is in its upright position. The side walls assume an upright position enclosing the platform sides when the platform is in its inclined position.

2 Claims, 15 Drawing Figures

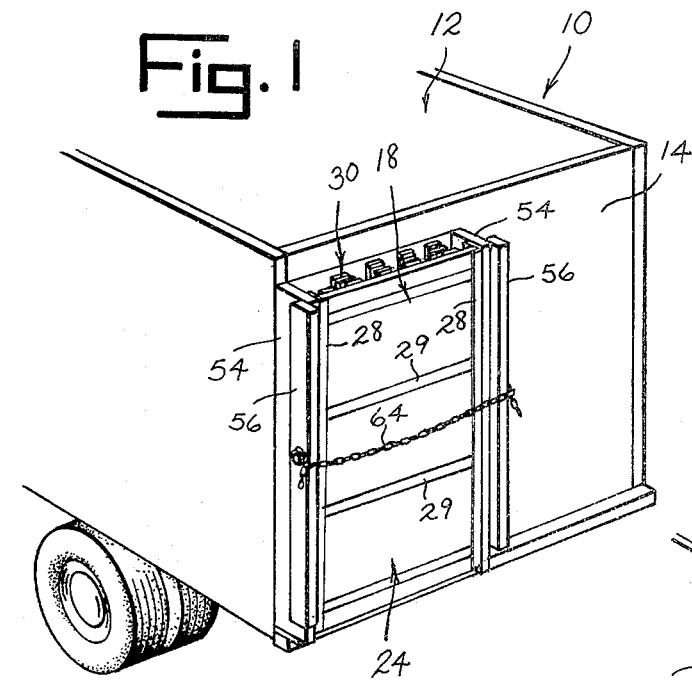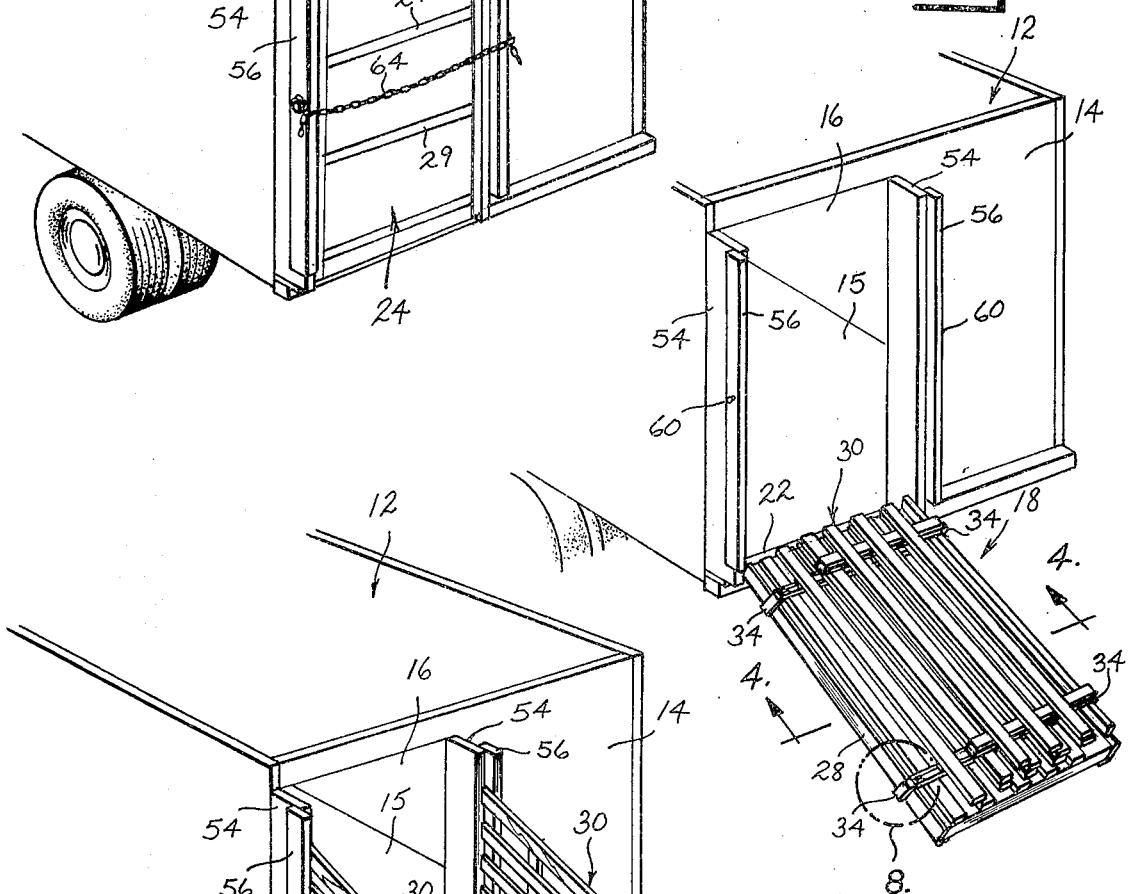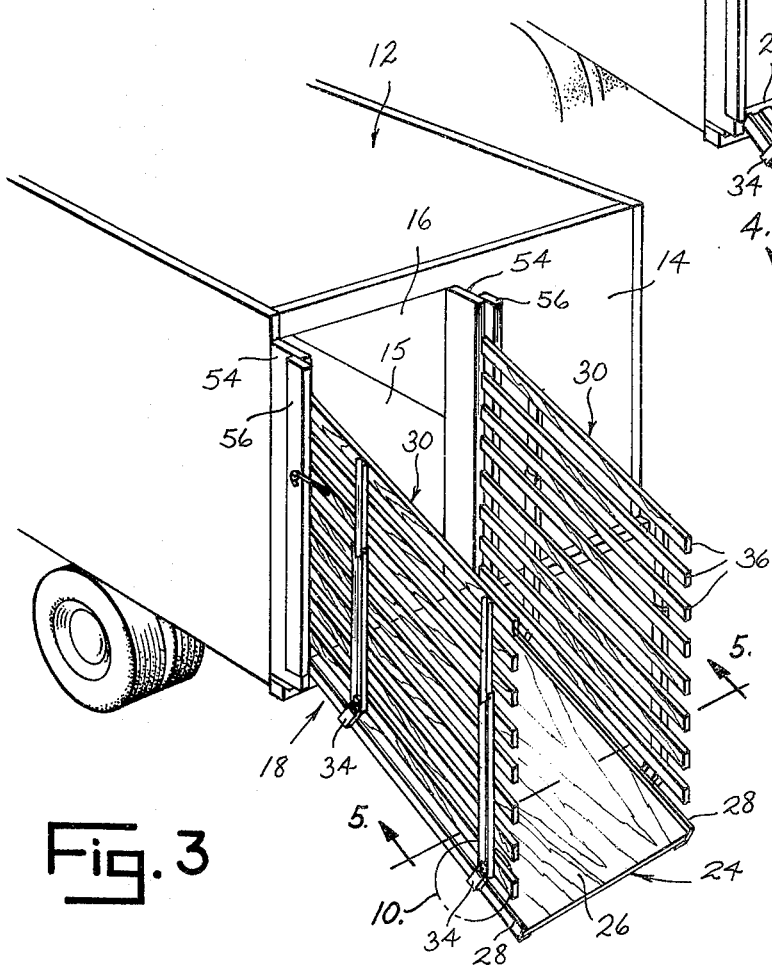

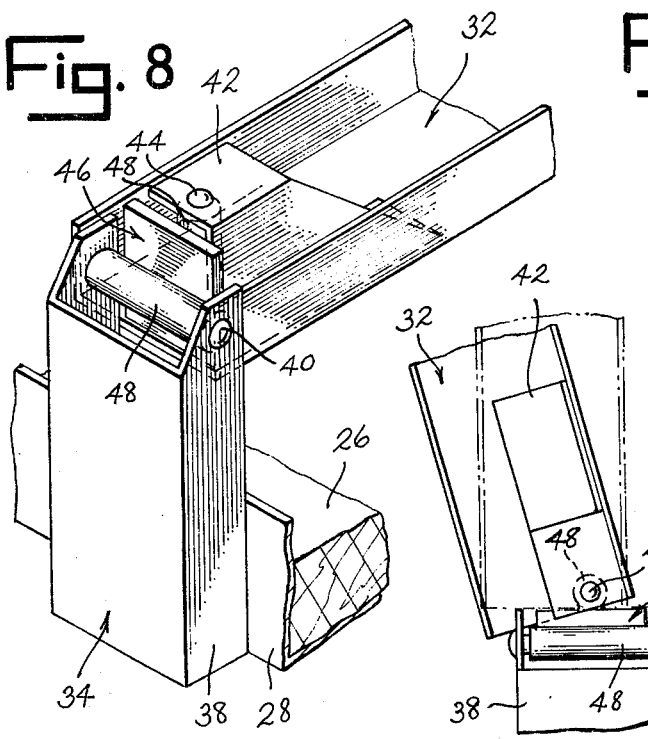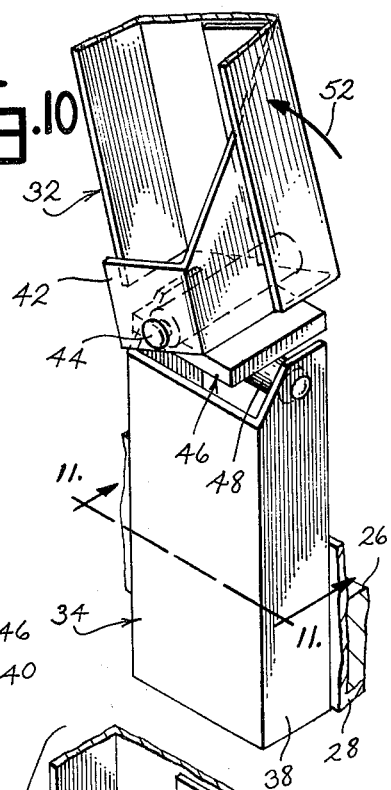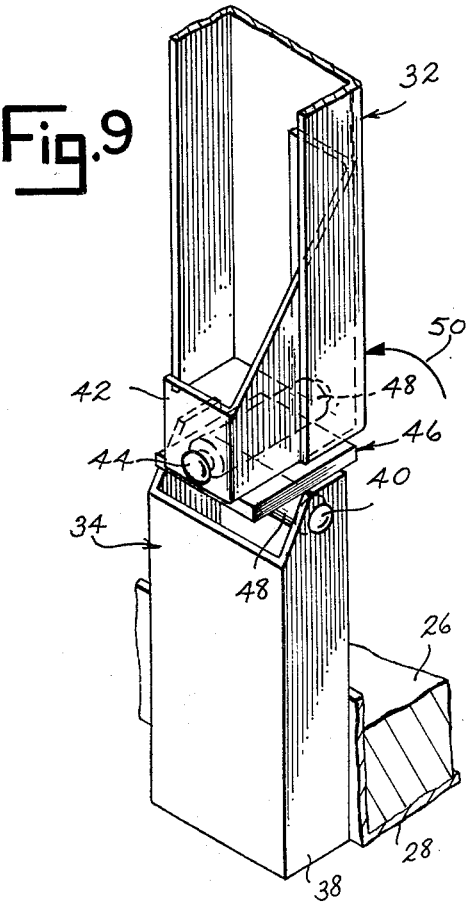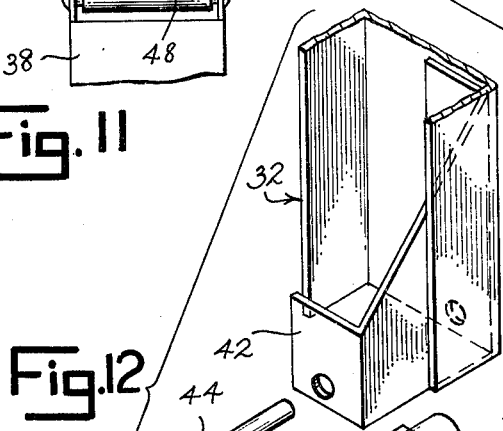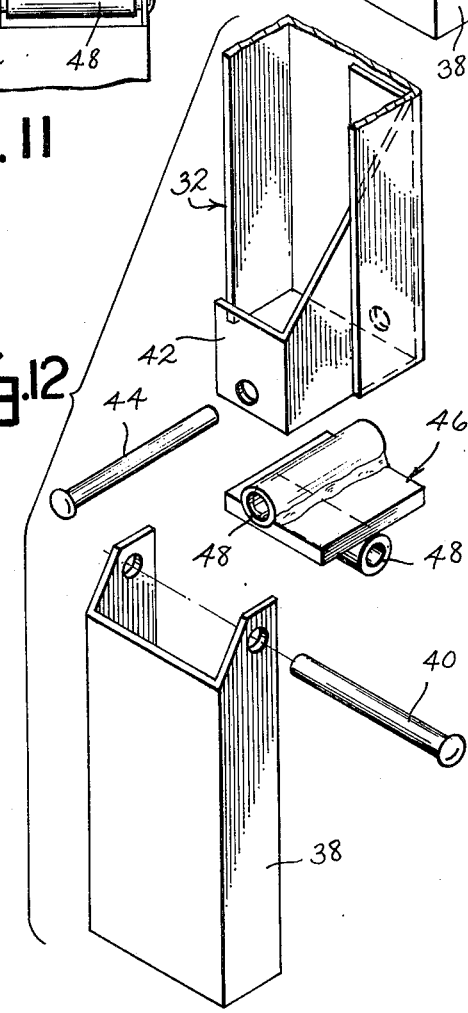

COLLAPSIBLE LIVESTOCK RAMP

SUMMARY OF THE INVENTION

This invention relates to a livestock ramp and will have specific application to a collapsible ramp utilized in conjunction with a vehicle for hauling the livestock.

In this invention the ramp includes a platform which is pivotally connected at one end to the vehicle so as to be shiftable between an upright position spanning the door opening of the vehicle and an inclined position to allow the livestock to enter or leave the vehicle over the ramp. A side wall is connected to each side edge of the platform so as to be pivotal from a platform overlying position which enables the platform to be shifted into its closed position spanning the vehicle door opening and a generally right angular position relative to the platform when the platform is in its inclined position. Each of the side walls includes a pair of stanchions which are drawn into substantially vertical orientation after the side wall is placed in its right angular position. The vehicle door opening is framed by rearwardly projecting jambs between which the platform with collapsed side walls fits when in its upright position. When the platform is lowered into its inclined position, the side walls are unfolded and brought into right angular positions bearing against the vehicle door jambs which serve as locating means for the side walls.

Accordingly, it is an object of this invention to provide a collapsible livestock ramp which is of compact construction and which is of simple operation.

Another object of this invention is to provide a livestock ramp having a platform by which the livestock enter or depart from the vehicle and to which a pair of side walls are pivotally connected.

Still another object of this invention is to provide a collapsible livestock ramp which is of economical manufacture.

Other objects of this invention will become apparent upon a reading of the invention's description.

BRIEF DESCRIPTION OF THE DRAWINGS

FIGS. 1-12 are illustrative of one embodiment of this invention in which FIG. 1 is a perspective view of a vehicle having the ramp of this invention connected to it and shown in its upright closed position.

FIG. 2 is a perspective view of the ramp of FIG. 1 showing the ramp lowered to the ground in perparation for use.

FIG. 3 is a perspective view of the ramp of this invention shown with its side walls in their right angular positions and in operative form.

FIG. 4 is a sectional view taken along line 4—4 of FIG. 2 showing the side walls of the ramp in their overlapping positions in solid lines and in intermediate extended positions as shown in broken lines.

FIG. 5 is a sectional view taken along 5—5 of FIG. 3.

FIG. 6 is a side view showing one side wall of the ramp pivoted into its right angular position relative to the ramp platform in preparation for being secured to the vehicle.

FIG. 7 is a side view of the ramp showing the side wall of FIG. 6 secured in its right angular position with the stanchions thereof assuming vertical orientations.

FIGS. 8-10 are fragmentary perspective views of the universal joint which connects the side wall stanchions of the ramp to the ramp platform and which is shown in sequential positions during set up of the ramp.

FIG. 11 is a side view of the universal joint as seen along line 11—11 of FIG. 10.

FIG. 12 is an exploded perspective view showing the component parts of each universal joint which connects the stanchions of the side wall to the ramp platform.

FIGS. 13-15 are views of another embodiment of the ramp of this invention in which FIG. 13 shows the ramp of this embodiment in its inclined position exposing the door opening into the vehicle.

FIG. 14 is a sectional view taken along line 14—14 of FIG. 13.

FIG. 15 is a sectional view showing the ramp of FIGS. 13 and 14 in its closed upright door opening spanning position.

DESCRIPTION OF THE PREFERRED EMBODIMENTS

Figure 4:
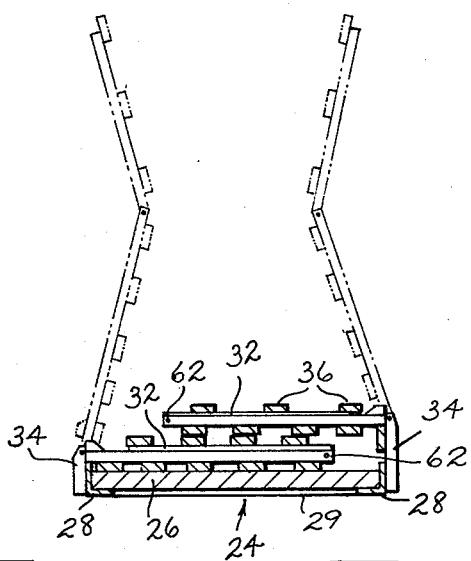
Figure 5:
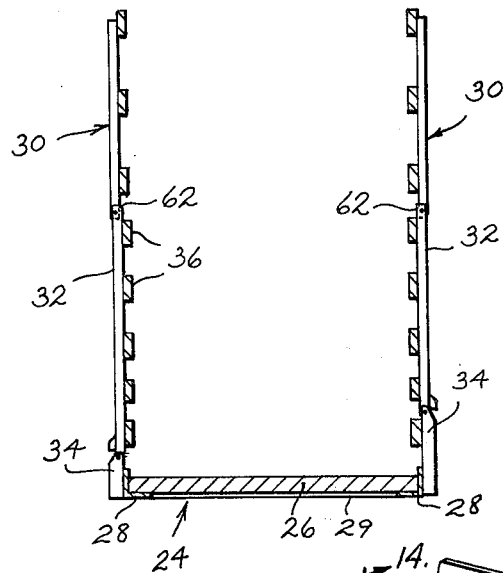

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of the livestock ramp shown in FIGS. 1-12 will be described first. In FIG. 1, a vehicle 10 having a compartment 12 for the housing of livestock is shown. Vehicle compartment 12 is elevated and includes a rear wall 14 having a door opening 16 formed in it and a floor 15. A ramp 18 is connected to vehicle compartment 12 at door opening 16.

Ramp 18 includes a platform 24 which is pivotally connected at one end by a hinge 20 to the threshold 22 of door opening 16. Platform 24 is shiftable about hinge 20 from a generally upright position spanning door opening 16 as shown in FIG. 1 and an inclined position such as that shown in FIG. 3 which permits livestock to depart from and to enter vehicle compartment 12. Platform 24 includes a wooden floor 26 supported upon a metal frame which includes angle irons 28 extending along each side edge of the platform and interconnecting transverse cross braces 29. A side wall 30 is pivotally connected at each side edge of platform 24. Each side wall 30 includes a pair of stanchions 32. Each stanchion 32 is connected at its lower end by a universal joint 34 to an angle iron 28 of the platform. Each side wall 30 also includes a plurality of parallel slats 36 which are spaced from the lower ends to the upper ends of stanchions 32 and which are secured to the stanchions by pivot bolts or rivets.

Universal joint 34 which connects the lower end of each stanchion 32 to platform 24 is illustrated in detail in FIGS. 8-12 and includes a channel part 38 which is welded to an angle iron 28 of the platform. The upper end of channel part 38 is formed into a fork through which a pivot pin 40 is inserted. The lower end of each stanchion 32 is provided with a support bracket 42 which in conjunction with the stanchion forms a fork-type arrangement having a pivot pin 44 inserted therein. Pivot pins 40 and 44 are disposed at right angles to each other. Each universal joint includes a bearing member 46 which has right angularly crossed bearing sleeves 48. Pivot pins 40 and 44 are journaled within sleeves 48. This arrangement for each universal joint 34 permits each side wall 30 when folded over platform 24 as shown in FIGS. 2 and 8 to be first swung upwardly as seen in broken lines in FIG. 4 and as indicated by arrow 50 in FIG. 9 into the right angular position shown in FIG. 6. Each side wall 30 is then shifted in a generally vertical plane toward vehicle 10 as indicated by arrow 52 in FIG. 10 until stanchions 32 assume substantially vertically oriented positions with the slats 36 of each side wall generally paralleling platform 24. This movement of stanchions 32 toward vehicle 10 can be observed in FIG. 11 with the broken line position of stanchion 32 representing the orientation shown in FIG. 6 and the solid line position of the stanchion representing the orientation shown in FIG. 7.

A pair of jambs 54 are located at door opening 16 and extend rearwardly from rear wall 14 of vehicle compartment 16. Each jamb 54 includes an outset lip 56 against which the forward ends of slats 36 of each side wall 30 overlap and contact when the side wall is placed in its upright position with stanchions 32 being vertically oriented. This engagement between jamb lips 56 and slats 36 of the side walls prevents the side walls from opening outwardly or pivoting so as to fall onto the ground. A hook 58 is connected to one of the slats 36 of each side wall 30. A pin 60 is connected to each jamb 54. Side wall stanchions 32 are retained in their vertical orientations with slats 36 bearing against jamb lips 56 by having hooks 58 engaged over pins 60.

The storage of ramp 18 is facilitated by having stanchions 32 of each side wall 30 hinged at 62. This permits side walls 30 to be formed into hinged component parts which can be folded over one another and platform 24 as shown in FIG. 4 in preparation for raising the platform into its upright position between jambs 54. A chain 64 extends between jambs 54 and is utilized to secure platform 24 in its upright position. With platform 24 in its upright position closing door opening 16, vehicle 10 may not be moved from one location to another.

Figure 15:
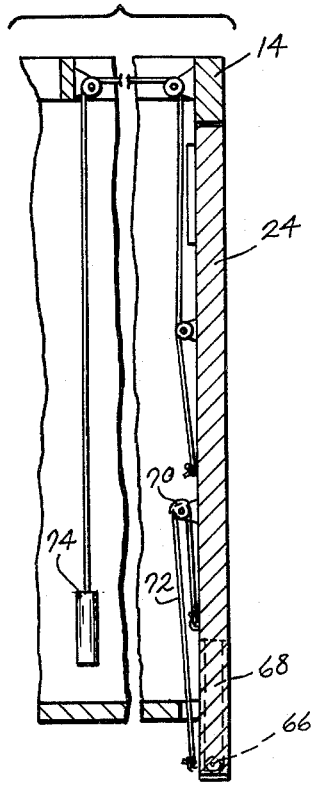
Figure 14:
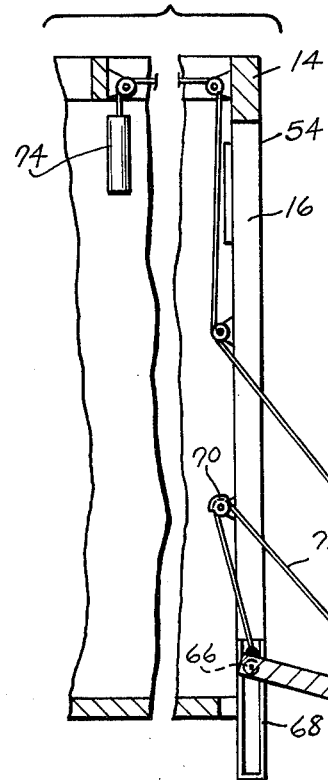
Figure 13:
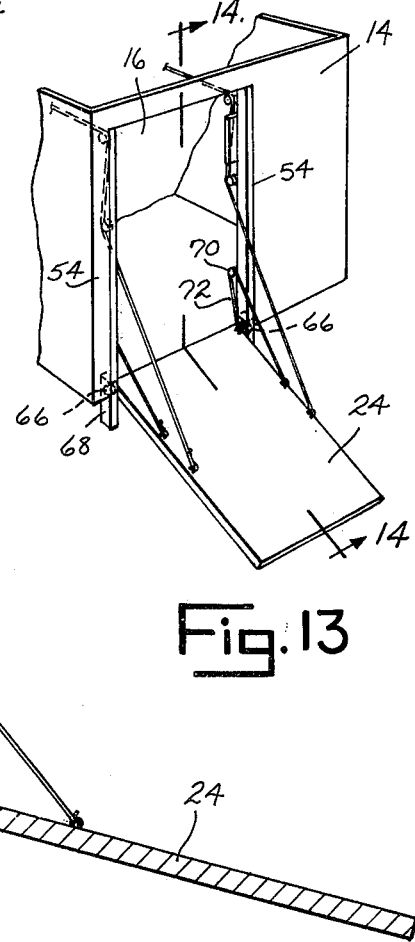
Figure 6:
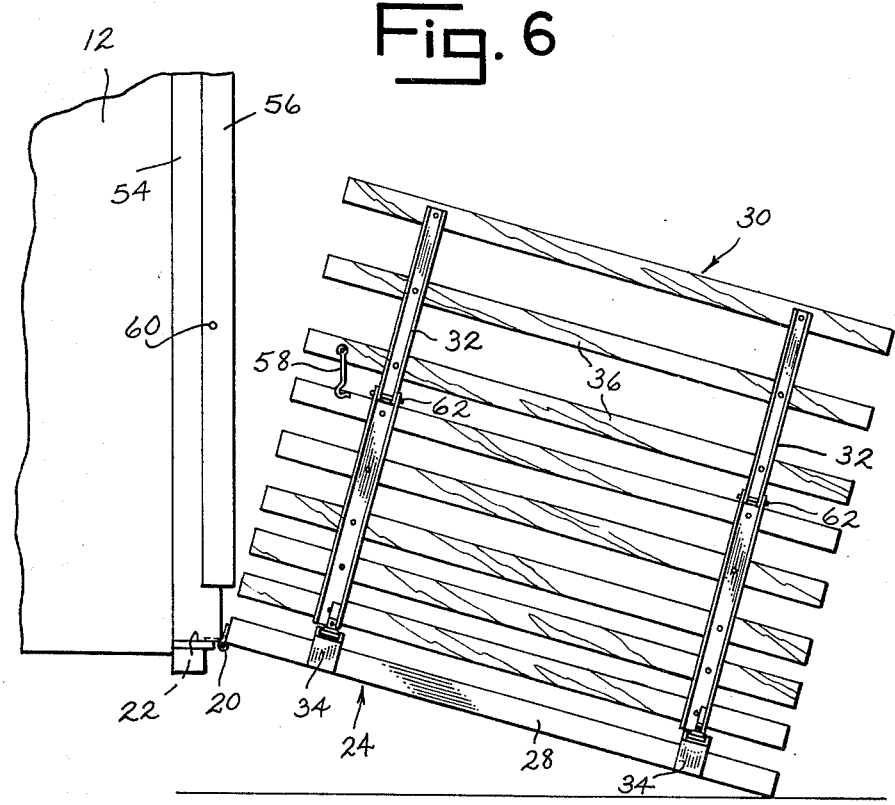
Figure 7:
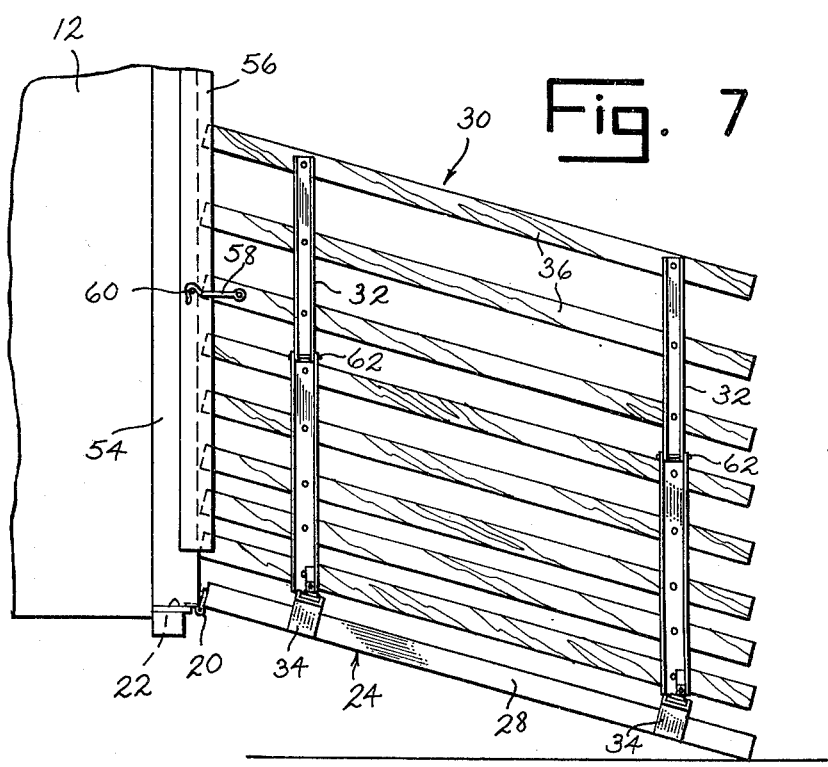

In FIGS. 13-15 a second embodiment of this invention is illustrated. In this embodiment of the invention, platform 24 utilizes support pins 66 in place of hinges for connection to vehicle compartment 12. Pins 66 are coaxially aligned and project outwardly from opposite side edges of the platform. Each pin 66 is received within an elongated guide member 68 which permits the pivoted end of the platform to shift between upper and lower positions within the guide member. A pulley 70 is secured to each jamb 54 of door opening 16. A cable 72 is trained about each pulley 70 and has its end portions connected to platform 24 at its adjacent side edge. Pulleys 70 and cables 72 support the platform in its inclined position as illustrated in FIGS. 13 and 14. A counterbalance 74 is positioned at each side of compartment 16 of vehicle 10 and is connected by a pulley and cable system to platform 24. Counterbalances 74 serve as means for assisting in raising and lowering platform 24. In FIG. 15 the platform is shown in its upright position spanning door opening 16 with pins 66 of the platform being supported by guide members 68. With platform 24 shown in its inclined position as shown in FIGS. 13 and 14, a suitable locking device (not shown) may be utilized in conjunction with pulley 70 and cable 72 to secure the pivoted end of the platform at pins 66 in a fixed location. Side walls (not shown) may be utilized in conjunction with the platform 24 depicted in FIGS. 13-15.

It is to be understood that the invention is not to be limited to the details above given but may be modified within the scope of the appended claims.

What I claim is:

1. In combination a vehicle and collapsible livestock ramp, said vehicle including a livestock compartment having an elevated floor and a rear wall having a door opening therein, said ramp including a platform, means pivotally connecting said platform at one end to said vehicle adjacent said floor at said door opening wherein said platform is pivotal between a generally upright position spanning said door opening and an inclined position whereby livestock may enter or leave said compartment, the improvement comprising said platform connecting means including guide parts carried by said compartment at the rear wall thereof on each side of said door opening, each guide part extending vertically from below to at least the level of said floor, a pulley carried by said rear wall at each side of said door opening above said guide parts, said platform one end carrying support means fitting shiftably within said guide parts for guiding the movement of said platform one end between elevated and lowered positions within the guide parts as the platform is shifted between its inclined and upright positions, a pair of cable means, one of said cable means passing about each pulley and having one end connected to said platform adjacent a said support means and its opposite end connected to said platform between said platform one end and the other end of the platform for supporting said platform one end in its elevated position within said guide parts when said platform is in its inclined position, and means extending between said compartment and platform for raising and lowering said platform between its upright and inclined positions.

2. The combination vehicle and livestock ramp of claim 1 and including counterbalance means connected between said vehicle compartment and platform for assisting the lowering and raising of said platform between its upright and inclined positions.

* * * * *